Oct. 30, 1923.
A. M. McLAMB
DRAFT COUPLING
Filed April 18, 1922
1,472,368
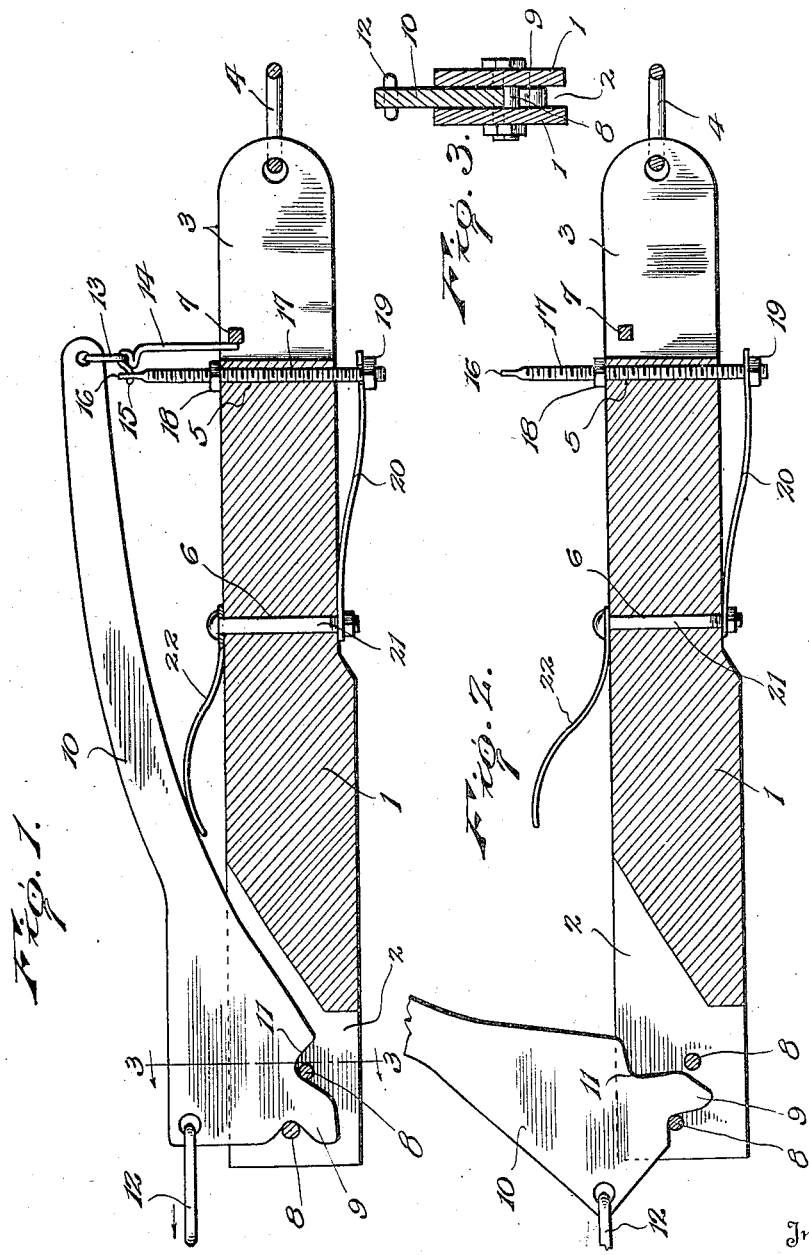

Patented Oct. 30, 1923.

1,472,368

UNITED STATES PATENT OFFICE.

ALEXANDER M. McLAMB, OF LUMBERTON, NORTH CAROLINA.

DRAFT COUPLING.

Application filed April 13, 1922. Serial No. 554,899.

*To all whom it may concern:*

Be it known that I, ALEXANDER M. MC-LAMB, a citizen of the United States, residing at Lumberton, in the county of Robeson and State of North Carolina, have invented certain new and useful Improvements in Draft Couplings, of which the following is a specification.

This invention relates to draft couplings and has for its object the provision of a simple device whereby a plow or other agricultural implement may be effectually connected to a tractor or a team of draft animals and by the use of which the implement will be disconnected automatically from the draft-applying instrumentality when an immovable obstruction is encountered. In the use of agricultural implements, it frequently happens that a large root, stone, or other obstruction is met by the implement and the implement is badly damaged owing to the fact that it cannot pass the obstruction, and the halting of the draft team or stopping of the tractor cannot be accomplished until it is too late to avoid damage. My invention provides a coupling whereby hauling power will be effectually applied to the agricultural implement and the implement will not normally be disconnected from the draft-applying instrumentality but when an immovable obstruction is encountered, the coupling will be released and injury to the parts avoided.

In the accompanying drawings, which illustrate one embodiment of my invention,—

Figure 1 is a view, partly in side elevation and partly in longitudinal section, of a draft coupling embodying my improvements;

Fig. 2 is a similar view showing the coupling released;

Fig. 3 is a detail transverse section on the line 3—3 of Fig. 1.

In carrying out my invention, I employ a bar 1 which is constructed with a longitudinal recess 2 at one end and at its other end is slotted or notched, as indicated at 3. A clevis 4 or other draft-applying device is carried by the slotted end of the draft bar 1, and this clevis or other draft device may be connected to a tractor or to whiffletrees carried by a draft team or to any other draft-applying instrumentality. Immediately in rear of the slot or notch 3, a vertical opening 5 is formed through the draft bar and in rear of the said opening, a bolt-receiving opening 6 is formed through the bar. Near the rear end of the slot or notch 3, a stop 7 is extended across the same near the upper edge of the draft bar for a purpose which will presently appear. Extending transversely through the draft bar, near the rear end of the recess 2, are the spaced studs or pins 8, between which is received the tongue 9 extending from the lower edge of the draft lever 10, a notch 11 being formed in the lower edge of the said lever immediately in advance of the tongue 9, as clearly shown. When the device is in its normal position, as shown in Fig. 1, the lever extends longitudinally of the draft bar and forwardly over the same, the notch 11 seating upon the forward rest or transverse pin 8 and the tongue 9 extending downwardly and slightly rearwardly between the two rests or pins 8. At the upper rear corner of the lever or arm 10, I attach a link 12 which may be connected directly with a plow or other implement or may be one member of a flexible connection extending to the said implement. In the front end of the lever or arm 10, I pivotally suspend a link 13 which carries a latch 14 depending normally into the upper portion of the notch or slot 3 and engaging the rear side of the stop 7, as clearly shown in Fig. 1. This latch 14 is constructed with a rearwardly extending finger 15 normally engaging an eye 16 at the upper end of a retainer or keeper 17. The keeper or retainer 17 is preferably in the form of a threaded rod extending through the opening 5 and equipped with nuts 18 and 19, whereby it may be adjusted relative to the draft bar. A leaf spring 20 is carried by one end of the bolt 21 which is extended through the opening 6 of the draft bar, and the free end of this spring 20 engages around the keeper 17 and bears against the nut 19 thereon. The force of the spring is exerted to draw the keeper downwardly through the draft bar, and this downward movement of the keeper is limited by the nut 18 thereon coming into contact with the top of the draft bar, as clearly shown, so that by properly adjusting the nut 18, the tension of the spring 20 will be regulated and, therefore, the force exerted upon the lip 15 will be controlled. A spring 22 is carried by the upper end of the bolt 21 and extends rearwardly to bear against the under edge of the lever or arm 10, as clearly shown.

Normally, the lower free end of the latch 14 bears against the stop 7, as shown in Fig. 1, and the lip 15 fits within the eye 16 of the keeper, and the frictional engagement between the wall of the eye and the lip will prevent detachment of these parts. The force exerted by the spring 20 holds the latch against the stop 7 and, therefore, exerts a pull downwardly upon the link 13 which holds the lever or arm 10 in the operative position illustrated in Fig. 1. The spring 20 acts constantly in opposition to the spring 22 so that the lip 15 cannot easily slip from the eye 16. Should the plow or other implement strike a large root or stone which it cannot turn aside, the draft upon the implement will be increased to such an extent that the force of the spring 20 will be overcome and the keeper 17 will be drawn upwardly by the lever 10 until the end of the latch 14 clears the stop 7, whereupon the latch will swing forwardly and the lip 15 will at once be withdrawn from the eye 16 so that the pulling force exerted upon the lever or arm 10 through the link 12 will rock the lever about the rests 8 and release it from the draft arm, as will be readily understood upon reference to Fig. 2. This described action of the lever will be effected instantly so that no damage will be caused to the implement and no parts will be broken through the increased draft. Of course, when the coupling is released, the operator will at once become aware of the fact and will stop the tractor or the draft team. After the implement has been cleared of the obstruction, the coupling can be readily returned to its normal condition inasmuch as the latch will be still carried by the lever, and it will be necessary merely to engage the tongue 9 between the rests or pins 8, as indicated in Fig. 2, and then rock the lever downwardly and forwardly so that the latch may be again set in the position shown in Fig. 1.

My device is exceedingly simple in the construction and arrangement of its parts and will act instantly when necessity arises, although normally it will effectually couple the implement with the hauling instrumentality.

Having thus described the invention, what is claimed as new is:

1. In a draft coupling, the combination of a draft bar, a draft lever extending longitudinally of and releasably engaged at one end with the draft bar, a latch freely suspended upon the opposite end of the draft lever, a keeper on the draft bar, a stop on the draft bar, the free end of the latch normally bearing against the rear side of the stop, a finger projecting rearwardly from the latch and engaging the keeper, and yieldable means upon the draft bar tending constantly to release the lever from the draft bar.

2. In a draft coupling, the combination of a draft bar, a stop on the draft bar, a draft lever releasably engaged with the draft bar, a spring carried by the draft bar and bearing upon the lever and tending constantly to release the same from the draft bar, a latch suspended on the draft lever and normally engaging the stop on the draft bar, a keeper movably mounted on the draft bar and engaging the latch, yieldable means acting on the keeper to maintain it in engagement with the latch but permit it under abnormal strains to release the latch, and adjustable means for limiting the movement of the keeper in one direction.

In testimony whereof I affix my signature.

ALEX. M. McLAMB. [L. S.]